(12) United States Patent
Chi et al.

(10) Patent No.: US 8,282,712 B2
(45) Date of Patent: Oct. 9, 2012

(54) AIR FILTRATION MEDIUM WITH IMPROVED DUST LOADING CAPACITY AND IMPROVED RESISTANCE TO HIGH HUMIDITY ENVIRONMENT

(75) Inventors: Cheng-Hang Chi, Midlothian, VA (US); Hyun Sung Lim, Midlothian, VA (US); Lu Zhang, Midlothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 484 days.

(21) Appl. No.: 12/418,928

(22) Filed: Apr. 6, 2009

(65) Prior Publication Data

US 2009/0249956 A1    Oct. 8, 2009

Related U.S. Application Data

(60) Provisional application No. 61/132,498, filed on Jun. 19, 2008, provisional application No. 61/123,350, filed on Apr. 7, 2008.

(51) Int. Cl.
*B01D 46/00* (2006.01)

(52) U.S. Cl. ............... 95/284; 55/486; 55/487

(58) Field of Classification Search .......... 95/273, 95/284; 55/487; 442/79, 82, 381–382; 210/488, 210/490–492, 499, 503–509
See application file for complete search history.

(56) References Cited

U.S. PATENT DOCUMENTS

| | | | |
|---|---|---|---|
| 2,797,163 A | 6/1957 | Smith et al. | |
| 3,228,825 A | 1/1966 | Waggoner | |
| 3,240,663 A | 3/1966 | Raczek | |
| 3,249,491 A | 5/1966 | Young at al. | |
| 3,253,978 A | 5/1966 | Bodendorf at al. | |
| 3,375,155 A | 3/1968 | Adams | |
| 3,882,135 A | 5/1975 | Pews et al. | |
| 4,127,706 A | 11/1978 | Martin et al. | |
| 4,178,157 A | 12/1979 | van Turnhout et al. | |
| 4,536,361 A | 8/1985 | Torobin | |
| 4,874,659 A | 10/1989 | Audo et al. | |
| 5,672,399 A | 9/1997 | Kahlbaugh et al. | |
| 6,183,670 B1 | 2/2001 | Torobin et al. | |
| 6,315,805 B1 | 11/2001 | Strauss | |
| 6,315,806 B1 | 11/2001 | Torobin et al. | |
| 6,382,526 B1 | 5/2002 | Reneker et al. | |
| 6,520,425 B1 | 2/2003 | Reneker | |

(Continued)

FOREIGN PATENT DOCUMENTS

DE    4443158    6/1996

(Continued)

OTHER PUBLICATIONS

PCT International Search Report and Written Opinion for International Application No. PCT/US2009/039742 dated Apr. 7, 2009.

*Primary Examiner* — Duane Smith
*Assistant Examiner* — Karla Hawkins

(57) ABSTRACT

A filtration medium is disclosed for use in air filters used in heating, ventilating and air conditioning systems. The medium contains at least one nanofiber layer of fibers having diameters less than 1 μm and at least one upstream layer, the medium having sufficient holding capacity for dust particles that efficiency loss and pressure loss across the medium are minimized during use.

96 Claims, 3 Drawing Sheets

U.S. PATENT DOCUMENTS

| | | |
|---|---|---|
| 6,521,321 B2 | 2/2003 | Kahlbaugh et al. |
| 6,695,992 B2 | 2/2004 | Renerker |
| 7,125,434 B2 | 10/2006 | Yavorsky et al. |
| 2004/0116028 A1* | 6/2004 | Bryner .................. 442/381 |
| 2004/0255783 A1 | 12/2004 | Graham et al. |
| 2006/0068668 A1 | 3/2006 | Kameoka et al. |
| 2006/0084340 A1 | 4/2006 | Bond et al. |
| 2006/0137317 A1 | 6/2006 | Bryner et al. |

FOREIGN PATENT DOCUMENTS

| | | |
|---|---|---|
| DE | 19618758 | 8/2001 |
| EP | 0687195 | 1/1999 |
| EP | 1834683 | 9/2007 |
| WO | WO 01/09425 * | 2/2001 |
| WO | WO 03/080905 | 10/2003 |

* cited by examiner

AIR FILTRATION MEDIUM WITH IMPROVED DUST LOADING CAPACITY AND IMPROVED RESISTANCE TO HIGH HUMIDITY ENVIRONMENT

CROSS REFERENCED TO RELATED APPLICATIONS

This application claims priority under 35 U.S.C. §119 from U.S. Provisional Application Ser. No. 61/132,498 (filed Jun. 19, 2008), and U.S. Provisional Application Ser. No. 61/123,350 (Apr. 7, 2008), the disclosures of which are incorporated by reference herein for all purposes as if fully set forth.

FIELD OF THE INVENTION

The present invention relates to air filtration media, for filtering particulate material from gas streams.

BACKGROUND OF THE INVENTION

Gas phase filtration has traditionally been accomplished by low, medium and high efficiency pleatable composite filter media which include either a low, medium or high efficiency fibrous filtration layer of randomly oriented fibers; and one or more permeable stiffening layers which enable the composite filter media to be pleated and to sustain its shape. Such filtration devices serve as vehicle passenger compartment air filters, high performance engine air filters and engine oil filters. ASHRAE (American Society of Heating Refrigeration and Air Conditioning Engineers) pleatable filters and the like typically use a pleated high efficiency filtration media for the filtration element.

Currently, the pleated high efficiency media normally used in these filtration devices are made from ASHRAE filter media or paper products. These paper products are made by a wet-laid technique wherein fibers, e.g. glass or cellulosic fibers, are dispersed in an aqueous binder slurry which is stirred to cause the fibers to become thoroughly and randomly mixed with each other. The fibers are then deposited from the aqueous binder slurry onto a conventional paper making screen or wire as in a Fourdrinier machine or a Rotoformer machine to form a matted paper which includes a binder resin, e.g., a phenolic resin. Pleated filter elements made from such papers can exhibit high efficiencies. However exhibit high pressure drops.

Electrostatically charged synthetic filter media are also used in these filtering applications, and these can attain very high filtration versus pressure drop performance characteristics, at least in their initial charge state. Electrostatically enhanced air filter media and media manufactured by the wet laid process, more specifically with the use of glass fibers, currently have limitations. Electrostatically treated meltblown filter media, as described in U.S. Pat. Nos. 4,874,659 and 4,178,157, perform well initially, but quickly lose filtration efficiency in use due to dust loading as the media begin to capture particles and the electrostatic charge thus becomes insulated. In addition, as the effective capture of particulates is based on the electrical charge, the performance of such filters is greatly influenced by air humidity, causing charge dissipation.

Filtration media utilizing microglass fibers and blends containing microglass fibers typically contain small diameter glass fibers arranged in either a woven or nonwoven structure, having substantial resistance to chemical attack and relatively small porosity. Such glass fiber media are disclosed in the following U.S. patents: Smith et al., U.S. Pat. No. 2,797,163; Waggoner, U.S. Pat. No. 3,228,825; Raczek, U.S. Pat. No. 3,240,663; Young et al., U.S. Pat. No. 3,249,491; Bodendorf et al., U.S. Pat. No. 3,253,978; Adams, U.S. Pat. No. 3,375,155; and Pews et al., U.S. Pat. No. 3,882,135. Microglass fibers and blends containing microglass fibers are typically relatively brittle when pleated, and produce undesirable yield losses. Broken microglass fibers can also be released into the air by filters containing microglass fibers, creating a potential health hazard if the microglass were to be inhaled.

Nonwoven webs have been disclosed for use in air filtration media. In U.S. Patent Application 2006/0137317(A1) to DuPont is claimed a filtration media consisting of a 2-layer scrim-nanofiber (SN) structure for air filters.

The SN medium gives good flux/barrier properties (i.e. high efficiency and low pressure drop). However, the dust-loading capacity is lower than the desired value in certain industrial HVAC applications when filters are challenged with very small dust particles, which can occur when the HVAC system is designed and constructed to have lower efficiency pre-filters in front of the high-efficiency final filters. In the SN structure, the scrim is typically made of nonwoven webs of fiber diameter of 14 to 30 microns which can pre-filter out particles larger than about 5 microns in size. The remaining particles will reach the thin nanofiber layer and quickly fill up the pores and plug up the filters. As the result, filter resistance increases rapidly and thus shortens filter life. Attempts have been made to increase the dust-loading capacity by increasing the basis weight and thickness of the scrim layer but the results are still unsatisfactory for the more demanding situations.

To further complicate the problem, when the humidity of the incoming air is high, dust loaded on the nanofiber layer of the filter media can pick up moisture and swell. It is widely known that a high percentage of atmospheric aerosol is hydroscopic in nature. This further reduces the remaining pore size and creates additional flow restriction and increased pressure drop across the filters. These spikes in pressure drop can create significant problems to HVAC systems.

U.S. Pat. No. 6,521,321 to Donaldson attempts to increase life-time of air filters by layering at least 6 to 7 coarse and fine fiber webs alternatively in a gradient-structure media (e.g. SNSNSN). The number of layering required makes this approach economically unattractive.

In U.S. Pat. No. 7,125,434 to Millipore Corporation attempts to use a deep gradient-density filter consists of three zones of materials for filtering biopharmaceutical fluids. The filter has a depth of at least 0.5 inch and is designed for liquid filtration. The thickness is prohibitive for pleated air filtration uses.

For purifying air both for air conditioning and ventilation purposes air filtering media and air filters produced to date therefore possess a certain, limited capacity to hold dust. High dust capacity filters are either uneconomical or not suited to this application. After reaching a certain limit, which may be expressed in terms of days of use or differential pressure, the media must be replaced. Dust holding capacity is consequently measured in accordance with the maximum amount of dust, which the air filter is able to accept before a lower limit for a certain quantity of air passing through it, and consequently the end of its service life, is reached.

The aim of media design is to achieve maximum dust storage capacity and accordingly service life under conditions of acceptable filtration efficiency. Since however the efficiency on the one hand and the service life on the other hand correlate negatively with each other, it is only possible to achieve an increase in service life in the case of single homogeneous ply media at the expense of the efficiency, unless the installed filter is simply increased in size. The size is however limited by increases in costs, but more especially also by limited space for installation so that for instance in the case of a pleated panel filter the number of the folds can not be increased to the necessary degree.

As a remedy the pleats in the impregnated paper in panel filters may be covered, for example, on the inlet side with a foam material ply, which is to retain a fraction of the dust or at least reduce the kinetic energy of the particles so that there will be an increase in the service life. This method does however involve substantial disadvantages as regards production technology, since the layer of foam material must be bonded to the pleated panel after production of the panel in a further processing stage, for example using beads of hot-melt adhesive.

For internal combustion engines gradient filters are also employed, which are produced from synthetic fiber and become increasingly denser in the direction of flow through the filter. In this case the coarse particles are separated at the surface and the fines are deposited deeper in the filter. A disadvantage here is that for a given amount of installation space substantially fewer pleats can be incorporated. This however increases the impact or inlet flow velocity with all the disadvantages connected therewith: higher pressure losses in the filter inherently owing to the higher flow velocity and deposit of the required dust quantity on less filter area so that the specific dust storage capacity must in this case be many times higher. Additionally such filter media make necessary a complete change in present day production systems, because sealing off the ends of the pleats is no longer possible using conventional hot-melt technology. In fact, the bellow-like folds are injected directly in an injection molding method in a plastic frame in the case of such media, something which is comparatively involved.

Further present day methods for increasing the service life, for example for air conditioning and ventilation applications are described in the German patent publication 9,218,021.3 (utility model) or also the European patent publication 0 687 195. Here a fine filter layer of meltblown micro-fiber non-woven material, which determines the efficiency, is covered with a coarse filter layer on the inlet side so that the dust holding capacity is boosted. The disadvantage is here that for a pleatable design a third layer is generally necessary, which provides the mechanical strength (more particularly stiffness) so that the pleated structure is self-supporting.

The principle of melt blowing is described by Wente, Van A. in the article "Superfine Thermoplastic Fibers" in Industrial Engineering Chemistry, Vol. 48, pages 1342-1346. In gas or, respectively, air filtration generally meltblown layers serve as high efficiency separating filter layers owing to the fine fibers with a diameter or normally somewhat under 1 µm to 10 µm and owing to the frequently applied electret charge and are for example described in the European patent publication 0 687 195, the German patent publication 9,218,021 (utility model) or the German patent publication 19,618,758, the fine meltblown layer always being employed of the outlet side (as a second filter layer). The support materials on the inlet flow side serve as dust storage means in the sense of depth filtration, the meltblown layer serves as a second filter stage in the sense of a fine dust filter. If a dust test is performed with the inlet flow on the "wrong side" that is to say with the meltblown side upstream, the initial degree of separation will be more or less identical, but the dust particle storage capacity goes down, i.e. an undesired filter cake is formed which increases the pressure loss on the inlet side with the meltblown layer surface.

The German patent publication 4,443,158 describes such a structure with the meltblown layer of the inlet side, the extremely high separating power of the meltblown material leading to a high degree of surface filtration, while the support material performs a purely mechanical function. The meltblown layer here produces an increase in the efficiency, but simultaneously a reduction in service life in comparison with the second layer with extremely open pores.

In U.S. Pat. No. 6,315,805 was disclosed that extremely coarse, open, e.g. fluffy meltblown non-woven material may be produced, which when used on the inlet side of a classical filter paper substantially increases service life, namely by approximately 30 to over 300%, dependent on the particular design. In this respect it is less a question of the meltblown non-woven material performing a true filtering function than of the formation of a filter cake on the inlet side of the paper, which embeds itself in the meltblown layer, assumes a substantially looser structure and hence causes less pressure loss. The '805 patent discloses to select for this purpose a fiber diameter of over 10 µm or even over 15 µm.

There remains a need to provide a relatively low cost, high efficiency filter media for these filtration applications which exhibit relatively high dirt-holding and/or air contaminant capacities and relatively low pressure drops as well as low and medium efficiency filter media which exhibit relatively high dirt-holding capacities and relatively low pressure drops.

One object of the present invention is to provide a filter medium and an air filter with which the dust holding capacity may be increased without any substantial change in the efficiency and without any great increase in the thickness of the filter medium.

SUMMARY OF THE INVENTION

The filter media of the invention comprises at least two nonwoven layers, one of which is a nanofiber web and a second upstream nonwoven layer in a face to face relationship with the nanofiber web. The filter media comprises a nanofiber web with a number average fiber diameter of less than one micron, and an upstream microfiber web layer in a face to face relationship with the nanofiber web where the ratio of the mean flow pore size of the microfiber web layer to that of the nanofiber web is between about 1 to about 10, preferably between about 1 to about 8, and more preferably between about 1 and about 6.

In a further embodiment, the filter media comprises a nanofiber web with a number average fiber diameter of less than one micron and an upstream microfiber web layer in a face to face relationship with the nanofiber web where the mean flow pore size of the microfiber web layer is between about 12 to about 40 microns, preferably between about 15 to about 25 microns and more preferably between about 18 to about 22 microns.

In a still further embodiment, the filter media comprises a nanofiber web with a number average fiber diameter of less than one micron and an upstream microfiber web layer in a face to face relationship with the nanofiber web where the ratio of the mean flow pore size of the microfiber web layer to the mass mean diameter of challenge particle is between about 50 and about 154 when the media has an efficiency of between 50% and 99.97% when impinged upon by particles of the particle size.

In one embodiment of the invention the basis weight of the upstream layer may be greater than about 5 gsm, preferably 10 gsm and more preferably 15 gsm or 30 gsm.

The efficiency of the upstream layer may be greater than about 50%, preferably greater than about 55% and more preferably greater than about 60%.

The upstream layer may also comprise a melt blown polymeric web.

The nanofiber web may comprise a nonwoven web made by a process selected from the group consisting of electroblowing, electrospinning, centrifugal spinning and melt blowing. The media may further comprise a scrim support layer in contact with either the nanofiber web or the upstream layer.

The invention is further directed to a method of filtering air comprising the step of passing the air through a media comprising a nanofiber web with a number average fiber diameter of less than one micron and an upstream microfiber web layer in a face to face relationship with the nanofiber web where the ratio of the mean flow pore size of the microfiber web layer to that of the nanofiber web is between about 1 to about 10.

In a further embodiment, the method of filtering air comprises the step of passing the air through a media comprising a nanofiber web with a number average fiber diameter of less than one micron and an upstream microfiber web layer in a face to face relationship with the nanofiber web where the mean flow pore size of the microfiber web layer is between about 12 to about 40 microns, preferably between about 15 to about 25 microns, and more preferably between about 18 and about 22 microns.

The method of filtering air may also comprise the step of passing the air through a media comprising a nanofiber web with a number average fiber diameter of less than one micron and an upstream microfiber web layer in a face to face relationship with the nanofiber web where the ratio of the mean flow pore size of the microfiber web layer to a particle size is between about 50 and about 154 when the media has an efficiency of between 50% and 99.97% when impinged upon by particles of the particle size.

The ratio of the mean flow pore size of the microfiber web layer to a particle size may be between about 57 and about 96 when the media has an efficiency of between 50% and 99.97% when impinged upon by particles of the particle size.

The ratio of the mean flow pore size of the microfiber web layer to a particle size may furthermore be between about 69 and about 85 when the media has an efficiency of between 50% and 99.97% when impinged upon by particles of the particle size.

In one embodiment of the method the basis weight of the upstream layer may be greater than about 5 gsm, preferably 10 gsm and more preferably 15 gsm or 30 gsm The efficiency of the upstream layer of the method may be greater than about 50%, preferably greater than about 55% and more preferably greater than about 60%.

The upstream layer of the method may comprise a melt blown polymeric web.

The nanofiber web of the method may comprise a nonwoven web made by a process selected from the group consisting of electroblowing, electrospinning, centrifugal spinning and melt blowing. The media may further comprise a scrim support layer in contact with either the nanofiber web or the upstream layer.

DETAILED DESCRIPTION OF THE INVENTION

Definitions

Figure 1:
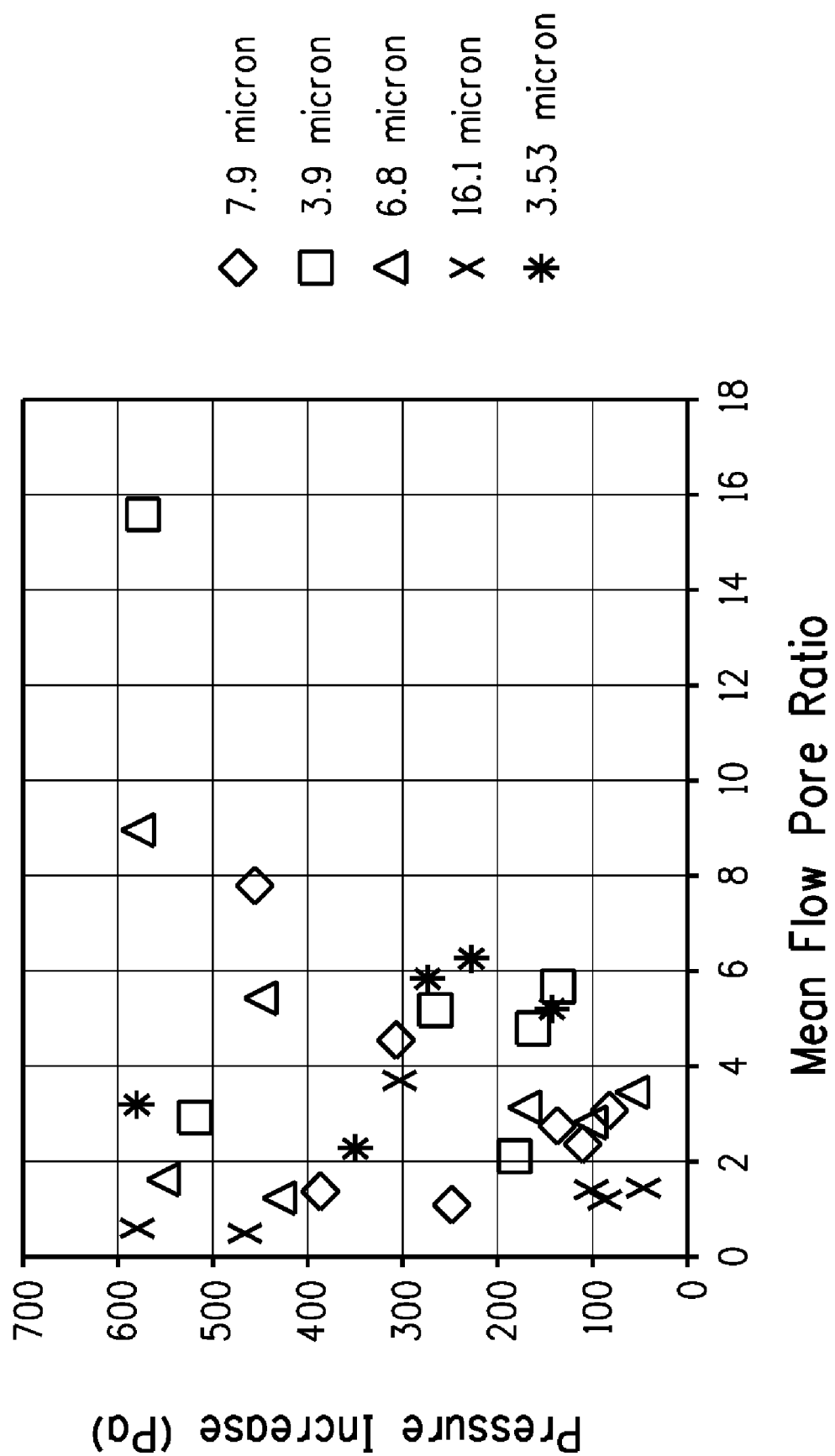
FIG. 1 shows the increase in pressure drop of the examples as a function of mean flow pore size ratio.

A "scrim" is a support layer and can be any structure with which the filter medium can be bonded, adhered or laminated. Advantageously, the scrim layers useful in the present invention are spunbond nonwoven layers, but can be made from carded webs of nonwoven fibers, melt blown nonwoven layers, woven fabrics, nets, and the like. Scrim layers useful for some filter applications require sufficient stiffness to hold pleat shape. A scrim as used in the present invention should have an open enough structure to not interfere with the dust holding structure of the medium.

The term "nonwoven" means a web including a multitude of fibers. The fibers can be bonded to each other or can be unbonded. The fibers can be staple fibers or continuous fibers. The fibers can comprise a single material or a multitude of materials, either as a combination of different fibers or as a combination of similar fibers each comprised of different materials.

By two or more webs being "in a face to face relationship" is meant that the surface of any one web is located essentially parallel to the surface of one or more other webs and in such a way that the web surfaces at least partially overlap. The webs need not be bonded to each other, but they may be partially or totally bonded to each other over at least a portion of the surfaces or edges.

The terms "nanofiber web" and "nanoweb" as used herein are synonymous.

A nonwoven fibrous web useful in embodiments of the invention may comprise fibers of polyethylene, polypropylene, elastomers, polyesters, rayon, cellulose, nylon, and blends of such fibers. A number of definitions have been proposed for nonwoven fibrous webs. The fibers usually include staple fibers or continuous filaments. As used herein "nonwoven fibrous web" is used in its generic sense to define a generally planar structure that is relatively flat, flexible and porous, and is composed of staple fibers or continuous filaments. For a detailed description of nonwovens, see "Nonwoven Fabric Primer and Reference Sampler" by E. A. Vaughn, ASSOCIATION OF THE NONWOVEN FABRICS INDUSTRY, 3d Edition (1992). The nonwovens may be carded, spun bonded, wet laid, air laid and melt blown as such products are well known in the trade.

Examples of nonwoven fabrics include meltblown webs, spunbond webs, carded webs, air-laid webs, wet-laid webs, spunlaced webs, and composite webs comprising more than one nonwoven layer.

The term "nanofibers" as used herein refers to fibers having a number average diameter less than about 1000 nm, even less than about 800 nm, even between about 50 nm and 500 nm, and even between about 100 and 400 nm. In the case of non-round cross-sectional nanofibers, the term "diameter" as used herein refers to the greatest cross-sectional dimension.

The experimental conditions under which the filtration properties of the filter media are measured are best understood from the examples. However, unless otherwise specified herein, the filtration data are taken from a test in which a flat-sheet media with a circular opening of 11.3 cm diameter is subjected to a 0.5-hour, continuous loading of a sodium chloride aerosol with a mass mean diameter of 0.26 micron, an air flow rate of 40 liter/min corresponding to a face velocity of 6.67 cm/s, and an aerosol concentration of 16 mg/m$^3$.

Filtration efficiency and initial pressure drop are measured at the beginning of the test and the final pressure drop is measured at the end of the test. Pressure drop increase is calculated by subtracting the initial pressure drop from the final pressure drop.

The filter media of the invention comprises of at least two nonwoven layers, one of which is a nanofiber web and a second upstream nonwoven layer in a face to face relationship with the nanofiber web where the ratio of the mean flow pore size of the microfiber web layer to that of the nanofiber web is between about 1 to about 10, preferably between about 1 to about 8, and more preferably between about 1 and about 6.

In further embodiments, the ratio of the mean flow pore sizes of the microweb layer to the nanoweb layer are preferably related to the desired overall efficiency of the media, which can be controlled by the pore size of the nanoweb. For example, in further embodiments of the media the ratio of the mean flow pore size of the microfiber web layer to that of the nanofiber web is between about 1 to about 3 when the media has an efficiency of greater than about 60%. The ratio of the mean flow pore size of the microfiber web layer to that of the nanofiber web is between about 2 to about 4 when the media has an efficiency of greater than about 70%. The ratio of the mean flow pore size of the microfiber web layer to that of the nanofiber web is between about 4 to about 6 when the media has an efficiency of greater than about 80%.

The media of the invention may also be defined by the pore size of the upstream media. For example, the filter media may comprise a nanofiber web with a number average fiber diameter of less than one micron and an upstream microfiber web layer in a face to face relationship with the nanofiber web where the mean flow pore size of the microfiber web layer is between about 12 to about 40 microns, preferably between about 15 to about 25 microns and more preferably between about 18 to about 22 microns.

The media of the invention may also comprise a nanofiber web with a number average fiber diameter of less than one micron and an upstream microfiber web layer in a face to face relationship with the nanofiber web where the ratio of the mean flow pore size of the microfiber web layer to a particle size is between about 50 and about 154 when the media has an efficiency of between 50% and 99.97% when impinged upon by particles of the particle size. In a further embodiment the ratio of the mean flow pore size of the microfiber web layer to a particle size is between about 57 and about 96 when the media has an efficiency of between 50% and 99.97% when impinged upon by particles of the particle size.

In a still further embodiment, the ratio of the mean flow pore size of the microfiber web layer to a particle size is between about 69 and about 85 when the media has an efficiency of between 50% and 99.97% when impinged upon by particles of the particle size.

In any of the embodiments mentioned above or in the claims appended here, the media of the invention may also demonstrate low efficiency changes upon being exposed to particles in an air stream. For example, the filter media may exhibit an efficiency drop when filtering particles of size 0.26 microns of less than 5% over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

The media of the invention in any of its embodiments may also exhibit low pressure drops when exposed to particles in an air stream. For example, the filter media may exhibit pressure drop increase of less than 200 Pa when filtering particles of size 0.26 microns over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

In one embodiment of the invention the basis weight of the upstream layer may be greater than about 10 gsm, preferably 15 gsm and more preferably 20 gsm or 30 gsm.

The efficiency of the upstream layer may be greater than about 50%, preferably greater than about 55% and more preferably greater than about 60%. The upstream layer may comprise a melt blown polymeric web.

The nanofiber web may comprise a nonwoven web made by a process selected from the group consisting of electroblowing, electrospinning, centrifugal spinning and melt blowing. The nanoweb may have a basis weight of greater than about 2 grams per square meter (gsm), and preferably greater than about 3 gsm. The media may further comprise a scrim support layer in contact with either the nanofiber web or the upstream layer.

The media of the invention also may have resistance to the permeability decrease that may occur when a media is loaded with dust and exposed to moisture. For example, when loaded sodium chloride aerosol with a mass mean diameter of 0.26 micron to a final resistance of between 150 and 300 Pa, the present media may exhibit a permeability loss of less than about 25% when exposed for 8 hours and air with a relative humidity of 98% at 25° C.

The invention is further directed to a method of filtering gas, including air, comprising the step of passing the air through a media that comprises at least two nonwoven layers, one of which is a nanofiber web and a second upstream nonwoven layer in a face to face relationship with the nanofiber web where the ratio of the mean flow pore size of the microfiber web layer to that of the nanofiber web is between about 1 to about 10, preferably between about 1 to about 8, and more preferably between about 1 and about 6.

In further embodiments of the method, the ratio of the mean flow pore sizes of the microweb layer to the nanoweb layer are preferably related to the desired overall efficiency of the media, which can be controlled by the pore size of the nanoweb. For example, in further embodiments of the media the ratio of the mean flow pore size of the microfiber web layer to that of the nanofiber web is between about 1 to about 3 when the media has an efficiency of greater than about 60%. The ratio of the mean flow pore size of the microfiber web layer to that of the nanofiber web is between about 2 to about 4 when the media has an efficiency of greater than about 70%. The ratio of the mean flow pore size of the microfiber web layer to that of the nanofiber web is between about 4 to about 6 when the media has an efficiency of greater than about 80%.

The ratio of the mean flow pore size of the microfiber web layer to that of the nanofiber web in both the method and the web of the invention can be between about 5 to about 7 when the media has an efficiency of greater than about 90% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

The media of the invention may also be defined by the pore size of the upstream media. For example, the filter media may comprise a nanofiber web with a number average fiber diameter of less than one micron and an upstream microfiber web layer in a face to face relationship with the nanofiber web where the mean flow pore size of the microfiber web layer is between about 12 to about 40 microns, preferably between about 15 to about 25 microns and more preferably between about 18 to about 22 microns.

The media of the invention may also comprise a nanofiber web with a number average fiber diameter of less than one micron and an upstream microfiber web layer in a face to face relationship with the nanofiber web where the ratio of the mean flow pore size of the microfiber web layer to a particle size is between about 50 and about 154 when the media has an efficiency of between 50% and 99.97% when impinged upon by particles of the particle size. In a further embodiment the ratio of the mean flow pore size of the microfiber web layer to a particle size is between about 50 and about 154 when the media has an efficiency of between 50% and 99.97% when impinged upon by particles of the particle size.

In a still further embodiment of the method, the ratio of the mean flow pore size of the microfiber web layer to a particle size is between about 50 and about 154 when the media has an efficiency of between 50% and 99.97% when impinged upon by particles of the particle size.

In any of the embodiments mentioned above or in the claims appended here, the media of the invention may also demonstrate low efficiency changes upon being exposed to particles in an air stream. For example, the filter media may exhibit an efficiency drop when filtering particles of size 0.26 microns of less than 5% over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

The media used in the method of the invention in any of its embodiments may also exhibit low pressure drops when exposed to particles in an air stream. For example, the filter media may exhibit a pressure drop when filtering particles of size 0.26 microns of less than 200 Pa over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

In one embodiment of the invention the basis weight of the upstream layer may be greater than about 10 gsm, preferably 15 gsm and more preferably 20 gsm or 30 gsm.

The efficiency of the upstream layer may be greater than about 50%, preferably greater than about 55% and more preferably greater than about 60%. The upstream layer may comprise a melt blown polymeric web.

The nanofiber web may comprise a nonwoven web made by a process selected from the group consisting of electroblowing, electrospinning, centrifugal spinning and melt blowing. The nanoweb may have a basis weight of greater than about 2 gsm, and preferably greater than about 3 gsm. The media may further comprise a scrim support layer in contact with either the nanofiber web or the upstream layer.

The media of the invention also may have resistance to the permeability decrease that may occur when a dust-loaded media is exposed to moisture or humid air. For example, when loaded sodium chloride aerosol with a mass mean diameter of 0.26 micron to a final resistance of between 150 and 300 Pa, the present media may exhibit a permeability loss of less than about 25% when exposed to air with a relative humidity of 98% at 25° C. for 8 hours.

In one embodiment of the method the basis weight of the upstream layer may be greater than about 10 gsm, preferably 15 gsm and more preferably 20 gsm or 30 gsm.

The efficiency of the upstream layer of the method may be greater than about 55%, preferably greater than about 60% and more preferably greater than about 65%.

The upstream layer may comprise a melt blown polymeric web.

The nanofiber web of the method may comprise a nonwoven web made by a process selected from the group consisting of electroblowing, electrospinning, centrifugal spinning and melt blowing. The media may further comprise a scrim support layer in contact with either the nanofiber web or the upstream layer.

The as-spun nanoweb may comprise primarily or exclusively nanofibers, advantageously produced by electrospinning, such as classical electrospinning or electroblowing, and in certain circumstances, by meltblowing or other such suitable processes. Classical electrospinning is a technique illustrated in U.S. Pat. No. 4,127,706, incorporated herein in its entirety, wherein a high voltage is applied to a polymer in solution to create nanofibers and nonwoven mats. However, total throughput in electrospinning processes is too low to be commercially viable in forming heavier basis weight webs.

The "electroblowing" process is disclosed in World Patent Publication No. WO 03/080905, incorporated herein by reference in its entirety. A stream of polymeric solution comprising a polymer and a solvent is fed from a storage tank to a series of spinning nozzles within a spinneret, to which a high voltage is applied and through which the polymeric solution is discharged. Meanwhile, compressed air that is optionally heated is issued from air nozzles disposed in the sides of, or at the periphery of the spinning nozzle. The air is directed generally downward as a blowing gas stream which envelopes and forwards the newly issued polymeric solution and aids in the formation of the fibrous web, which is collected on a grounded porous collection belt above a vacuum chamber. The electroblowing process permits formation of commercial sizes and quantities of nanowebs at basis weights in excess of about 1 gsm, even as high as about 40 gsm or greater, in a relatively short time period.

Nanowebs can also be produced for the invention by the process of centrifugal spinning. Centrifugal spinning is a fiber forming process comprising the steps of supplying a spinning solution having at least one polymer dissolved in at least one solvent to a rotary sprayer having a rotating conical nozzle, the nozzle having a concave inner surface and a forward surface discharge edge; issuing the spinning solution from the rotary sprayer along the concave inner surface so as to distribute said spinning solution toward the forward surface of the discharge edge of the nozzle; and forming separate fibrous streams from the spinning solution while the solvent vaporizes to produce polymeric fibers in the presence or absence of an electrical field. A shaping fluid can flow around the nozzle to direct the spinning solution away from the rotary sprayer. The fibers can be collected onto a collector to form a fibrous web.

Nanowebs can be further produced for the media of the invention by melt processes such as melt blowing. For example, nanofibers can include fibers made from a polymer melt. Methods for producing nanofibers from polymer melts are described for example in U.S. Pat. No. 6,520,425; U.S. Pat. No. 6,695,992; and U.S. Pat. No. 6,382,526 to the University of Akron, U.S. Pat. No. 6,183,670; U.S. Pat. No. 6,315,806; and U.S. Pat. No. 4,536,361 to Torobin et al., and U.S. publication number 2006/0084340.

A substrate or scrim can be arranged on the collector to collect and combine the nanofiber web spun on the substrate, so that the combined fiber web is used as a high-performance filter, wiper and so on. Examples of the substrate may include various nonwoven cloths, such as meltblown nonwoven cloth, needle-punched or spunlaced nonwoven cloth, woven cloth, knitted cloth, paper, and the like, and can be used without limitations so long as a nanofiber layer can be added on the substrate. The nonwoven cloth can comprise spunbond fibers, dry-laid or wet-laid fibers, cellulose fibers, melt blown fibers, glass fibers, or blends thereof.

Polymer materials that can be used in forming the nanowebs of the invention are not particularly limited and include both addition polymer and condensation polymer materials such as, polyacetal, polyamide, polyester, polyolefins, cellulose ether and ester, polyalkylene sulfide, polyarylene oxide, polysulfone, modified polysulfone polymers, and mixtures thereof. Preferred materials that fall within these generic classes include, poly (vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a $T_g$ greater than room temperature). This is the case for polyvinylchloride and polymethylmethacrylate, polystyrene polymer compositions or alloys or low in crystallinity for polyvinylidene fluoride and polyvinylalcohol materials. One preferred class of polyamide condensation polymers are nylon materials, such as nylon-6, nylon-6, 6, nylon 6, 6-6, 10, and the like. When the polymer nanowebs of the invention are formed by meltblowing, any thermoplastic polymer capable of being meltblown into nanofibers can be used, including polyolefins, such as polyethylene, polypropylene and polybutylene, polyesters such as poly(ethylene terephthalate) and polyamides, such as the nylon polymers listed above.

It can be advantageous to add known-in-the-art plasticizers to the various polymers described above, in order to reduce the $T_g$ of the fiber polymer. Suitable plasticizers will depend upon the polymer to be electrospun or electroblown, as well as upon the particular end use into which the nanoweb will be introduced. For example, nylon polymers can be plasticized with water or even residual solvent remaining from the electrospinning or electroblowing process. Other known-in-the-art plasticizers which can be useful in lowering polymer $T_g$ include, but are not limited to aliphatic glycols, aromatic sulphanomides, phthalate esters, including but not limited to those selected from the group consisting of dibutyl phthalate, dihexl phthalate, dicyclohexyl phthalate, dioctyl phthalate, diisodecyl phthalate, diundecyl phthalate, didodecanyl phthalate, and diphenyl phthalate, and the like. The Handbook of Plasticizers, edited by George Wypych, 2004 Chemtec Publishing, incorporated herein by reference, discloses other polymer/plasticizer combinations which can be used in the present invention.

EXAMPLES

Web Preparation

For the examples, a 24% solution of polyamide-6, 6 in formic acid was spun by electroblowing as described in WO 03/080905 to form nanowebs. The number average fiber diameters were approximately 350 nm.

Test Methods

Fine Particle Flat Sheet Loading Test

ASHRAE dust and ISO fine dust are typically used as test aerosol in dust holding capacity test for filters as well as filter media. However the size of these two types of dust (greater than 15 micron mass average particle diameter) are not reflective of the size of dust which high efficiency air filters are challenged with in field applications, especially when pre-filters are used to remove large particles. Our field measurement in an air handling system with pre-filters indicates that particles larger than 3 microns are rare and between 0.3 to 10 microns size range, about 60% particle by mass falls between 0.3 to 0.5 micron size range. Therefore existing dust holding test using ASHRAE and ISO fine test aerosol does not accurately predict filter media dust holding capacity in real life situation. To overcome this problem, a fine particle dust-loading test was developed which uses test aerosol with a mass mean diameter of 0.26 micron.

Fine particle dust-loading tests were conducted on flat-sheet media using automated filter test (TSI Model No. 8130) with a circular opening of 11.3 cm diameter (area=100 $cm^2$). A 2 wt % sodium chloride aqueous solution was used to generate fine aerosol with a mass mean diameter of 0.26 micron, which was used in the loading test. The air flow rate was 40 liter/min which corresponded to a face velocity of 6.67 cm/s. According to equipment manufacturer, the aerosol concentration was about 16 $mg/m^3$. Filtration efficiency and initial pressure drop are measured at the beginning of the test and the final pressure drop is measured at the end of the test. Pressure drop increase is calculated by subtracting the initial pressure drop from the final pressure drop.

Fiber Size Measurement

Ten scanning electron microscope (SEM) images at 5,000× magnification were taken of each nanofiber layer sample. The diameter of eleven (11) clearly distinguishable nanofibers were measured from the photographs and recorded. Defects were not included (i.e., lumps of nanofibers, polymer drops, intersections of nanofibers). The average fiber diameter for each sample was calculated.

For microfiber layer sample, five SEM images were taken. The diameter of at least 10 microfibers was measured from each photograph and recorded. The average fiber diameter for each sample was calculated.

Air Permeability

Filtration media air flow permeability is commonly measured using the Frazier measurement (ASTM D737). In this measurement, a pressure difference of 124.5 N/m2 (0.5 inches of water column) is applied to a suitably clamped media sample and the resultant air flow rate is measured as Frazier permeability or more simply as "Frazier". Herein, Frazier permeability is reported in units of ft3/min/ft2. High Frazier corresponds to high air flow permeability and low Frazier corresponds to low air flow permeability.

Humidity Test

The objective of the humidity test is to study the effect of relative humidity on filtration media loaded with dust or aerosol. Flat sheet media samples were loaded with fine aerosol of NaCl (as described above) to a final resistance between 150 to 300 Pa. The samples were conditioned at 25° C. at different relative humidity for at least 8 hours. Air permeability of the sample was measured and recorded immediately after samples were removed from the conditioning chamber.

Filtration Efficiency Measurement

The filtration efficiency measurement was conducted on flat-sheet media using automated filter test (TSI Model No. 8130) with a circular opening of 11.3 cm diameter (area=100 cm2). A 2 wt % sodium chloride aqueous solution was used to generate fine aerosol with a mass mean diameter of 0.26 micron. The air flow rate was 40 liter/min which corresponded to a face velocity of 6.67 cm/s. Filtration efficiency and initial pressure drop were measured and recorded at the beginning of the test.

Mean Flow Pore Measurement

Mean Flow Pore (MFP) size was measured according to ASTM Designation E 1294-89, "Standard Test Method for Pore Size Characteristics of Membrane Filters Using Automated Liquid Porosimeter" which approximately measures pore size characteristics of membranes with a pore size diameter of 0.05 μm to 300 μm by using automated bubble point method from ASTM Designation F 316 using a capillary flow porosimeter (model number CFP-34RTF8A-3-6-L4, Porous Materials, Inc. (PMI), Ithaca, N.Y.). Individual samples (8, 20 or 30 mm diameter) were wetted with low surface tension fluid (1,1,2,3,3,3-hexafluoropropene, or "Galwick," having a surface tension of 16 dyne/cm). Each sample was placed in a holder, and a differential pressure of air was applied and the fluid removed from the sample. The differential pressure at which wet flow is equal to one-half the dry flow (flow without wetting solvent) is used to calculate the mean flow pore size using supplied software. Bubble Point refers to the largest pore size.

Results

Nanofiber web with a mean fiber size of 0.35 microns were used and the basis weight ranged from 2.2 to 2.5 g/m². Microfiber web with mean fiber size of 1.7 to 3.6 microns and MFP of 8.5 to 61 microns were used and the basis weight ranged from 8 to 50 g/m². The multi-layer composite was loaded with fine aerosol (mass mean diameter of 0.26 micron) generated from 2 wt % NaCl, as described in the Test Method section. The pressure drop increase was calculated from the initial and the final resistance, and summarized in the table. As shown in table 1, the pressure drop increase is highly affected by the selection of the microfiber layer. In Examples 1 to 3, microfiber webs of fiber size 2.5 to 3.4 microns and MFP of 18.5 to 22.5 microns and filtration efficiencies of 64 to 86% were used, and the pressure drop increase was between 88 to 134 Pa. In Examples 4 and 5, microfiber web of fiber size of 3.3 to 4.0 microns and MFP of 36.3 to 61.2 microns and filtration efficiency of 41% to 52% was used, and the pressure drop increase was 313 to 325 Pa. In Examples 6 and 7, a fine microfiber web of fiber size of 1.7 microns and MFP of 11.6 to 8.5 microns and filtration efficiency of 52% to 94.1% were used, and the pressure drop increase was 448 and 255 Pa. There is an optimal range of mean flow pore size and efficiency which would result in low pressure drop increase of less than 200 Pa. Without wishing to be limited by the mechanism of action of the media, when the microfiber size is large, it does not seem to provide sufficient pre-filtration for the nanofiber. When the microfiber is too small, it seems to create high resistance on the microfiber itself, as indicated in Examples 6 and 7.

Comparative Examples 1 and 2 used the same fine aerosol loading procedure except that the media was made of scrim and nanofiber. Without the microfiber layer, aerosol loaded on the nanofiber quickly and the pressure drop increase was high. In Comparatively Example 1, the nanofiber web did not have any pre-filtration layer and the resistance increased by 886 Pa. In Comparative Example 2, the nanofiber web was preceded by scrim layer made of 14 microns fiber size. The large fiber does not provide much pre-filtration against the fine aerosol and the resistance increase was 674 Pa.

Example 8 was conducted using nanofiber web made of polypropylene and microfiber web described in this invention. The fiber size was 220 nm and the basis weight was 2 gsm. The loading test was carried out following the same procedure described before. The resistance increase was 84 Pa, which is significantly lower than a resistance increase of 674 Pa without the microfiber, as shown in Comparative Example 3.

The results are summarized in tables 1 and 2. In table 1 the air flow is from left to right of the structure designation. For example an MNS structure refers to meltblown, nanofiber web, spunbond, with the air impinging first on the meltblown face. "Microfiber" in table 1 refers to the melt blown web. "Scrim" refers to the spunbond scrim. The data clearly show the increase in dust-holding capacity by using the new approach described in this invention. Example 4, which falls within the claims of the invention, has a microfiber layer with an efficiency of just over 50% and the highest pressure increase of all the examples. Example 6 contains a microfiber layer with a higher efficiency but lower basis weight, and exhibits a pressure increase in between that of example 4 and the other examples. The comparative examples either have no upstream layer or an upstream layer that has a fiber size outside of the claims of the invention. The pressure increase is significantly larger than for the examples of the invention.

TABLE 1

| Structure | Example 1 MNS | Example 2 SMNS | Example 3 SMNS | Example 4 SMN |
|---|---|---|---|---|
| Upstream scrim wt | None | 68 | 68 | 68 |
| Upstream scrim fiber size (micron) | None | 50 | 50 | 50 |
| Microfiber wt (gsm) | 36 | 30 | 30 | 30 |
| Microfiber size (micron) | 3.2 | 2.5 | 3.4 | 3.3 |
| Nanofiber type | Nylon 6,6 | Nylon 6,6 | Nylon 6,6 | Nylon 6,6 |
| Nanofiber wt (gsm) | 2.2 | 2.2 | 2.2 | 2.2 |
| Average MFP of the microfiber layer (μm) | 22.5 | 18.5 | 20.8 | 61.2 |
| Average MFP of the nanofiber layer (μm) | 7.8 | 7.8 | 7.8 | 7.8 |
| MFP ratio of microfiber and nanofiber layer | 2.88 | 2.37 | 2.67 | 7.84 |
| Nanofiber size (micron) | 0.40 | 0.40 | 0.40 | 0.40 |
| Initial resistance (Pa) | 38 | 45 | 37 | 52 |
| Final resistance (Pa) | 126 | 151 | 171 | 377 |
| Resistance increase (Pa) | 88 | 106 | 134 | 325 |
| Total efficiency (%) | 91 | 93 | 84 | 86 |
| Microfiber efficiency (%) | 79 | 86 | 64 | 51 |

| Structure | Example 5 MNS | Example 6 MNS | Example 7 MNS | Example 8 MNS |
|---|---|---|---|---|
| Upstream scrim wt | None | None | None | None |
| Upstream scrim fiber size (micron) | None | None | None | None |
| Microfiber wt (gsm) | 50 | 15 | 8 | 36 |
| Microfiber size (micron) | 4.0 | 1.7 | 1.7 | 3.2 |
| Nanofiber type | Nylon 6,6 | Nylon 6,6 | Nylon 6,6 | Polypropylene |
| Nanofiber wt (gsm) | 2.2 | 2.2 | 2.2 | 2.0 |
| Average MFP of the microfiber layer (μm) | 36.3 | 8.5 | 11.6 | 22.5 |
| Average MFP of the nanofiber layer (μm) | 7.8 | 7.8 | 7.8 | 9.2 |

TABLE 1-continued

| | | | | |
|---|---|---|---|---|
| MFP ratio of microfiber and nanofiber layer | 4.65 | 1.09 | 1.48 | 2.45 |
| Nanofiber size (micron) | 0.40 | 0.40 | 0.40 | 0.22 |
| Initial resistance (Pa) | 28 | 44 | 34 | 32 |
| Final resistance (Pa) | 341 | 299 | 482 | 116 |
| Resistance increase (Pa) | 313 | 255 | 448 | 84 |
| Total efficiency (%) | 68.6 | 97.2 | 77.5 | 85 |
| Microfiber efficiency (%) | 41 | 94.1 | 52 | 79 |

TABLE 2

| Structure | Comparative Example 1 NS | Comparative Example 2 SN | Comparative Example 3 NS |
|---|---|---|---|
| Upstream scrim wt | None | 100 | None |
| Upstream scrim fiber size (micron) | None | 14 | None |
| Microfiber wt (gsm) | None | None | None |
| Microfiber size (micron) | None | None | None |
| Nanofiber type | Nylon 6,6 | Nylon 6,6 | Polypropylene |
| Nanofiber wt (gsm) | 4.5 | 4.5 | 2.0 |
| Initial resistance (Pa) | 49 | 44 | 46 |
| Final resistance (Pa) | 935 | 718 | 720 |
| Resistance increase (Pa) | 886 | 674 | 674 |
| Total efficiency (%) | 84 | 69 | 68 |
| Microfiber efficiency (%) | N/A | N/A | N/A |

Table 3 summarizes the results from the humidity test described above. Samples were loaded with NaCl and conditioned for at least 8 hours at 25 degree C. and 65% or 98% relative humidity, respectively. The air permeability of the sample was measured and recorded after conditioning. In Example 9, the nanofiber layer had an upstream layer of microfiber layer and the composite media was loaded with NaCl to a final resistance of 98 Pa, as measured at a face velocity of 6.67 cm/s. As the relative humidity in the conditioning environment changed from 65% to 98%, the air permeability of the sample dropped from 39.2 to 29.2 CFM/ft$^2$, which was 26%. In Example 10, a sample of the same construction was loaded with NaCl to a higher final resistance of 180 Pa. The drop in air permeability was 22%.

In Comparative Example 4, the nanofiber layer had an upstream layer of scrim material. The sample was loaded with NaCl to a final resistance of 147 Pa. When the relative humidity in the conditioning environment was changed from 65% to 98%, the air permeability of the sample dropped from 33.6 to 3.0 CFM/ft$^2$, a very significant drop of 91%.

These examples show the effect of the microfiber layer in protecting the nanofiber layer from the simultaneous effects of dust and moisture. The scrim layer is unable to provide such protection.

TABLE 3

| Structure | Example 9 MNS | Example 10 MNS | Comparative Example 4 SN |
|---|---|---|---|
| Upstream scrim wt | None | None | 100 |
| Upstream scrim fiber size (micron) | None | None | 14 |
| Microfiber wt (gsm) | 36 | 36 | None |
| Microfiber size (micron) | 2.2 | 2.2 | None |
| Nanofiber type | Nylon 6,6 | Nylon 6,6 | Nylon 6,6 |
| Nanofiber wt (gsm) | 3.0 | 3.0 | 4.5 |
| Nanofiber size (micron) | 0.35 | 0.35 | 0.35 |
| Resistance before NaCl loading (Pa) | 48 | 45 | 43 |
| Resistance after NaCl loading (Pa) | 98 | 180 | 147 |
| Air Perm @ 60% RH (CFM/ft2) | 39.2 | 30.0 | 33.6 |
| Air Perm @ 98% RH (CFM/ft2) | 29.2 | 23.3 | 3.0 |
| Permeability change | −26% | −22% | −91% |

In further examples, a 24% solution of polyamide-6, 6 in formic acid was spun by electroblowing as described in WO 03/080905 to form nanowebs. The number average fiber diameters were approximately 350 nm or 600 nm. Table 4 summarizes the nanoweb properties.

TABLE 4

| Example | Basis weight (gsm) | Fiber diameter (microns) | MFP (microns) |
|---|---|---|---|
| 9 | 6.8 | 350 | 3.53 |
| 10 | 4.5 | 350 | 3.9 |
| 11 | 1.3 | 350 | 6.8 |
| 12 | 2.2 | 400 | 7.8 |
| 13 | 1.0 | 600 | 16.1 |

Figure 2:
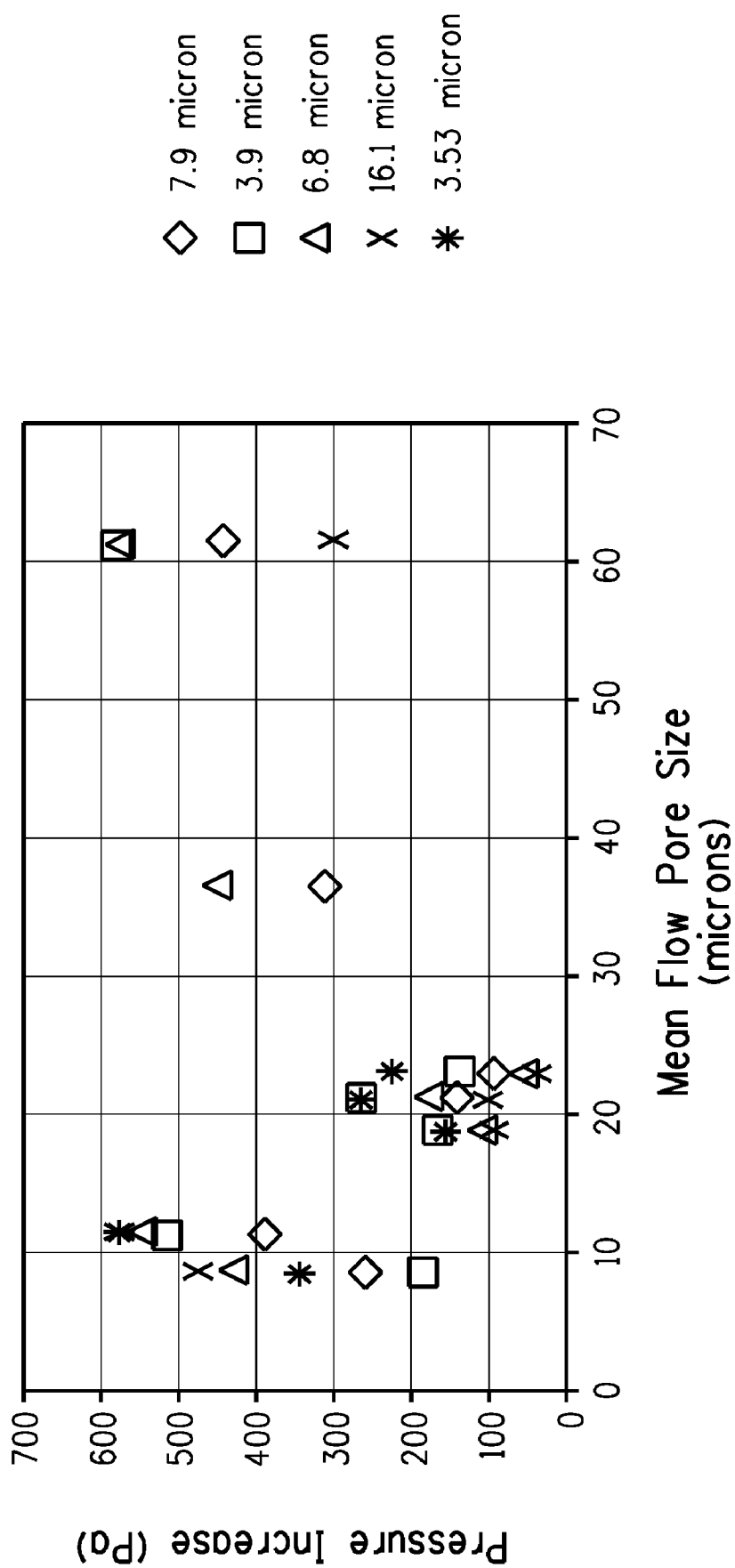
FIG. 2 shows the increase in pressure drop of the examples as a function of mean flow pore size of the upstream web.

FIGS. 1 and 2 show the effect of varying the pore size of the nanoweb layer on the pressure drop increase over 0.5 hours across the web. In FIG. 1, pressure drop increase is plotted against the mean flow pore size ratio between the upstream media and the nanoweb. In FIG. 2 the pressure drop increase is plotted against upstream media absolute pore size in microns. In both data sets, the pressure drop has a desirable minimum. In the plot of pressure drop increase against pore size ratio, the position of the minimum shifts to higher ratio as the nanoweb pore size increases, i.e. the efficiency rating of the nanoweb increases.

Figure 3:
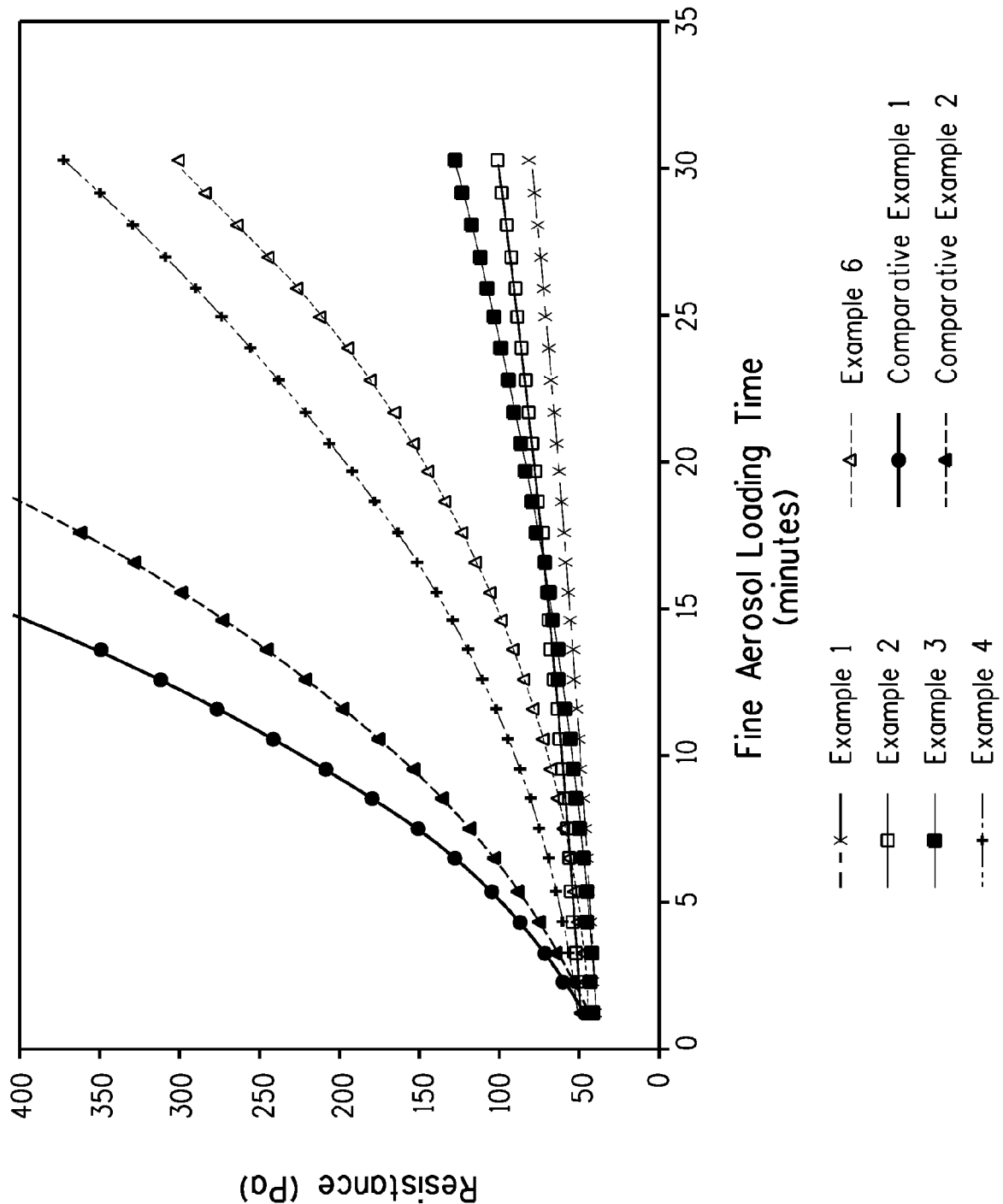
FIG. 3 shows the increase in pressure drop of the examples and comparative examples as a function of filtering time.

FIG. 3 illustrates the increase in pressure drop of the examples and comparative examples as a function of filtering time.

The present invention is illustrated herein by example, and various modifications may be made by a person of ordinary skill in the art. For example, various geometries, materials and web combinations fall within the scope of the invention.

It is therefore believed that the present invention will be apparent from the foregoing description. While the methods and articles shown or described have been characterized as being preferred it should be obvious that various changes and modifications may be made therefrom without departing from the spirit and scope of the invention as defined in the following claims.

What is claimed is:

1. A filter media comprising a nanofiber web with a number average fiber diameter of less than one micron and an upstream microfiber web layer in a face to face relationship with the nanofiber web where the ratio of the mean flow pore size of the microfiber web layer to that of the nanofiber web is between about 1 to about 10.

2. The media of claim 1 in which the ratio of the mean flow pore size of the microfiber web layer to that of the nanofiber web is between about 1 to about 8.

3. The media of claim 1 in which the ratio of the mean flow pore size of the microfiber web layer to that of the nanofiber web is between about 1 to about 6.

4. The media of claim 1 in which the filter media exhibits an efficiency drop when filtering particles of size 0.26 microns of less than 5% over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

5. The media of claim 1 in which the media when loaded with sodium chloride aerosol with a mass mean diameter of 0.26 micron to a final resistance of between 150 and 300 Pa, exhibits a permeability loss of less than about 25% when exposed for 8 hours to air with a relative humidity of 98% at 25° C.

6. The media of claim 1 in which the filter media exhibits a pressure drop increase of less than 200 Pa when filtering particles of size 0.26 microns over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

7. The media of claim 1 in which the nanoweb has a basis weight of at least about 2 gsm.

8. The media of claim 7 in which the nanoweb has a basis weight of at least about 3 gsm.

9. The media of claim 1 in which the ratio of the mean flow pore size of the microfiber web layer to that of the nanofiber web is between about 1 and about 3 when the media has an efficiency of greater than about 60% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

10. The media of claim 1 in which the ratio of the mean flow pore size of the microfiber web layer to that of the nanofiber web is between about 2 to about 4 when the media has an efficiency of greater than about 70% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

11. The media of claim 1 in which the ratio of the mean flow pore size of the microfiber web layer to that of the nanofiber web is between about 4 to about 6 when the media has an efficiency of greater than about 80% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

12. The media of claim 1 in which the ratio of the mean flow pore size of the microfiber web layer to that of the nanofiber web is between about 5 to about 7 when the media has an efficiency of greater than about 90% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

13. The media of claim 1 in which the microfiber web layer has an efficiency less than or equal to 95% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

14. A filter media comprising a nanofiber web with a number average fiber diameter of less than one micron and an upstream microfiber web layer in a face to face relationship with the nanofiber web where the mean flow pore size of the microfiber web layer is between about 13 to about 40 microns.

15. The filter media of claim 14 in which the upstream microfiber web layer has a mean flow pore size of between about 15 to about 25 microns.

16. The filter media of claim 14 in which the upstream microfiber web layer has a mean flow pore size of between about 18 to about 22 microns.

17. The media of claim 14 in which the filter media exhibits an efficiency drop when filtering particles of size 0.26 microns of less than 5% over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

18. The media of claim 14 in which the filter media exhibits a pressure drop increase of less than 200 Pa when filtering particles of size 0.26 microns over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

19. The media of claim 14 in which the nanoweb has a basis weight of at least 2 gsm.

20. The media of claim 14 in which the nanoweb has a basis weight of at least 3 gsm.

21. The media of claim 14 in which in which the media has an efficiency between about 50% and 99.97% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

22. A filter media comprising a nanofiber web with a number average fiber diameter of less than one micron and an upstream microfiber web layer in a face to face relationship with the nanofiber web where the ratio of the mean flow pore size of the microfiber web layer to a particle size is between about 50 and about 154 when the media has an efficiency of between 50% and 99.97% when impinged upon by particles of the particle size.

23. The media of claim 22 in which the ratio of the mean flow pore size of the microfiber web layer to a particle size is between about 57 and about 96 when the media has an efficiency of between 50% and 99.97% when impinged upon by particles of the particle size.

24. The media of claim 22 in which the ratio of the mean flow pore size of the microfiber web layer to a particle size is between about 69 and about 85 when the media has an efficiency of between 50% and 99.97% when impinged upon by particles of the particle size.

25. The media of claim 22 in which the filter media exhibits an efficiency drop when filtering particles of size 0.26 microns of less than 5% over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

26. The media of claim 22 in the filter media exhibits a pressure drop increase of less than 200 Pa when filtering particles of size 0.26 microns over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

27. The media of claim 22 in which the nanoweb has a basis weight of at least 2 gsm.

28. The media of claim 22 in which the nanoweb has a basis weight of at least 3 gsm.

29. The media of claim 22 in which in which the media has an efficiency between about 50% and 99.97% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

30. The media of claim 22 in which a scrim is positioned in between the nanofiber web and the upstream nonwoven layer.

31. The media of claim 22 in which the basis weight of the upstream layer is greater than about 10 gsm.

32. The media of claim 22 in which the basis weight of the upstream layer is greater than about 15 gsm.

33. The media of claim 22 in which the basis weight of the upstream layer is greater than about 20 gsm.

34. The media of claim 22 in which the basis weight of the upstream layer is greater than about 30 gsm.

35. The media of claim 22 in which the efficiency of the upstream layer is greater than about 55% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

36. The media of claim 22 in which the efficiency of the upstream layer is greater than about 60% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

37. The media of claim 22 in which the efficiency of the upstream layer is greater than about 65% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

38. The media of claim 1 in which the upstream layer comprises a melt blown polymeric web.

39. The media of claim 1 in which the nanofiber web comprises a nonwoven web made by a process selected from the group consisting of electroblowing, electrospinning, centrifugal spinning and melt blowing.

40. The media of claim 1 which further comprises a scrim support layer in contact with either the nanofiber web or the upstream layer or both.

41. A method of filtering air comprising the step of passing the air through a media comprising a nanofiber web with a number average fiber diameter of less than one micron and an upstream microfiber web layer in a face to face relationship with the nanofiber web where the ratio of the mean flow pore size of the microfiber web layer to that of the nanofiber web is between about 1 to about 10.

42. The method of claim 41 in which the ratio of the mean flow pore size of the microfiber web layer to that of the nanofiber web is between about 1 to about 8.

43. The method of claim 41 in which the ratio of the mean flow pore size of the microfiber web layer to that of the nanofiber web is between about 1 to about 6.

44. The method of claim 41 in which the filter media exhibits an efficiency drop when filtering particles of size 0.26 microns of less than 5% over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

45. The method of claim 41 in which the media when loaded sodium chloride aerosol with a mass mean diameter of 0.26 micron to a final resistance of between 150 and 300 Pa, exhibits a permeability loss of less than about 25% when exposed for 8 hours and air with a relative humidity of 98% at 25° C.

46. The method of claim 41 in which the filter media exhibits a pressure drop increase of less than 200 Pa when filtering particles of size 0.26 microns over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

47. The method of claim 41 in which the nanoweb has a basis weight of at least 2 gsm.

48. The method of claim 47 in which the nanoweb has a basis weight of at least 3 gsm.

49. The method of claim 41 in which the ratio of the mean flow pore size of the microfiber web layer to that of the nanofiber web is between about 1 to about 3 when the media has an efficiency of greater than about 60% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

50. The method of claim 41 in which the ratio of the mean flow pore size of the microfiber web layer to that of the nanofiber web is between about 2 to about 4 when the media has an efficiency of greater than about 70% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

51. The method of claim 41 in which the ratio of the mean flow pore size of the microfiber web layer to that of the nanofiber web is between about 4 to about 6 when the media has an efficiency of greater than about 80% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

52. The method of claim 41 in which the ratio of the mean flow pore size of the microfiber web layer to that of the nanofiber web is between about 5 to about 7 when the media has an efficiency of greater than about 90% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

53. The method of claim 41 in which the microfiber web layer has an efficiency less than or equal to 95% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

54. A method of filtering air comprising the step of passing the air through a media comprising a nanofiber web with a number average fiber diameter of less than one micron and an upstream microfiber web layer in a face to face relationship with the nanofiber web where the mean flow pore size of the microfiber web layer is between about 12 to about 40 microns.

55. The method of claim 54 in which the upstream microfiber web layer has a mean flow pore size of between about 15 to about 25 microns.

56. The method of claim 54 in which the upstream microfiber web layer has a mean flow pore size of between about 18 to about 22 microns.

57. The method of claim 54 in which the filter media exhibits an efficiency drop when filtering particles of size 0.26 microns of less than 5% over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

58. The method of claim 54 in which the filter media exhibits a pressure drop increase of less than 200 Pa when filtering particles of size 0.26 microns over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

59. The method of claim 54 in which the nanoweb has a basis weight of at least 2 gsm.

60. The method of claim 54 in which the nanoweb has a basis weight of at least 3 gsm.

61. The method of claim 54 in which in which the media has an efficiency between about 50% and 99.97% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

62. A method of filtering air comprising the step of passing the air through a media comprising a nanofiber web with a number average fiber diameter of less than one micron and an upstream microfiber web layer in a face to face relationship with the nanofiber web where the ratio of the mean flow pore size of the microfiber web layer to a particle size is between about 50 and about 154 when the media has an efficiency of between 50% and 99.97% when impinged upon by particles of the particle size.

63. The method of claim 62 in which the ratio of the mean flow pore size of the microfiber web layer to a particle size is between about 50 and about 154 when the media has an efficiency of between 50% and 99.97% when impinged upon by particles of the particle size.

64. The method of claim 62 in which the ratio of the mean flow pore size of the microfiber web layer to a particle size is between about 50 and about 154 when the media has an efficiency of between 50% and 99.97% when impinged upon by particles of the particle size.

65. The method of claim 62 in which the filter media exhibits an efficiency drop when filtering particles of size 0.26 microns of less than 5% over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

66. The method of claim 62 in the filter media exhibits a pressure drop increase of less than 200 Pa when filtering particles of size 0.26 microns over 0.5 hours in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

67. The method of claim 62 in which the nanoweb has a basis weight of at least 2 gsm.

68. The method of claim 62 in which the nanoweb has a basis weight of at least 3 gsm.

69. The method of claim 62 in which in which the media has an efficiency between about 50% and 99.97% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

70. The method of claim 41 in which a scrim is positioned in between the nanofiber web and the upstream nonwoven layer.

71. The method of claim 41 in which the basis weight of the upstream layer is greater than about 10 gsm.

72. The method of claim 41 in which the basis weight of the upstream layer is greater than about 15 gsm.

73. The method of claim 41 in which the basis weight of the upstream layer is greater than about 20 gsm.

74. The method of claim 41 in which the basis weight of the upstream layer is greater than about 30 gsm.

75. The method of claim 41 in which the efficiency of the upstream layer is greater than about 55% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

76. The method of claim 41 in which the efficiency of the upstream layer is greater than about 60% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

77. The method of claim 41 in which the efficiency of the upstream layer is greater than about 65% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

78. The method of claim 41 in which the upstream layer comprises a melt blown polymeric web.

79. The method of claim 41 in which the nanofiber web comprises a nonwoven web made by a process selected from the group consisting of electroblowing, electrospinning, centrifugal spinning and melt blowing.

80. The method of claim 41 which further comprises a scrim support layer in contact with either the nanofiber web or the upstream layer or both.

81. The media of claim 1 in which a scrim is positioned in between the nanofiber web and the upstream nonwoven layer.

82. The media of claim 1 in which the basis weight of the upstream layer is greater than about 10 gsm.

83. The media of claim 1 in which the basis weight of the upstream layer is greater than about 15 gsm.

84. The media of claim 1 in which the basis weight of the upstream layer is greater than about 20 gsm.

85. The media of claim 1 in which the basis weight of the upstream layer is greater than about 30 gsm.

86. The media of claim 1 in which the efficiency of the upstream layer is greater than about 55% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

87. The media of claim 1 in which the efficiency of the upstream layer is greater than about 60% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

88. The media of claim 1 in which the efficiency of the upstream layer is greater than about 65% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

89. The media of claim 14 in which a scrim is positioned in between the nanofiber web and the upstream nonwoven layer.

90. The media of claim 14 in which the basis weight of the upstream layer is greater than about 10 gsm.

91. The media of claim 14 in which the basis weight of the upstream layer is greater than about 15 gsm.

92. The media of claim 14 in which the basis weight of the upstream layer is greater than about 20 gsm.

93. The media of claim 14 in which the basis weight of the upstream layer is greater than about 30 gsm.

94. The media of claim 14 in which the efficiency of the upstream layer is greater than about 55% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

95. The media of claim 14 in which the efficiency of the upstream layer is greater than about 60% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

96. The media of claim 14 in which the efficiency of the upstream layer is greater than about 65% when filtering particles of size 0.26 microns in a test in which a flat-sheet media with a circular opening of 11.3 cm diameter is subjected to a sodium chloride aerosol with a mass mean diameter of 0.26 micron, an air flow rate of 40 liter/min corresponding to a face velocity of 6.67 cm/s, and an aerosol concentration of 16 mg/m$^3$.

* * * * *